Sept. 14, 1965    R. O. WALKER    3,205,779
DRAWBOLT FOR MACHINE TOOL SPINDLES
Filed Dec. 23, 1963    2 Sheets-Sheet 1
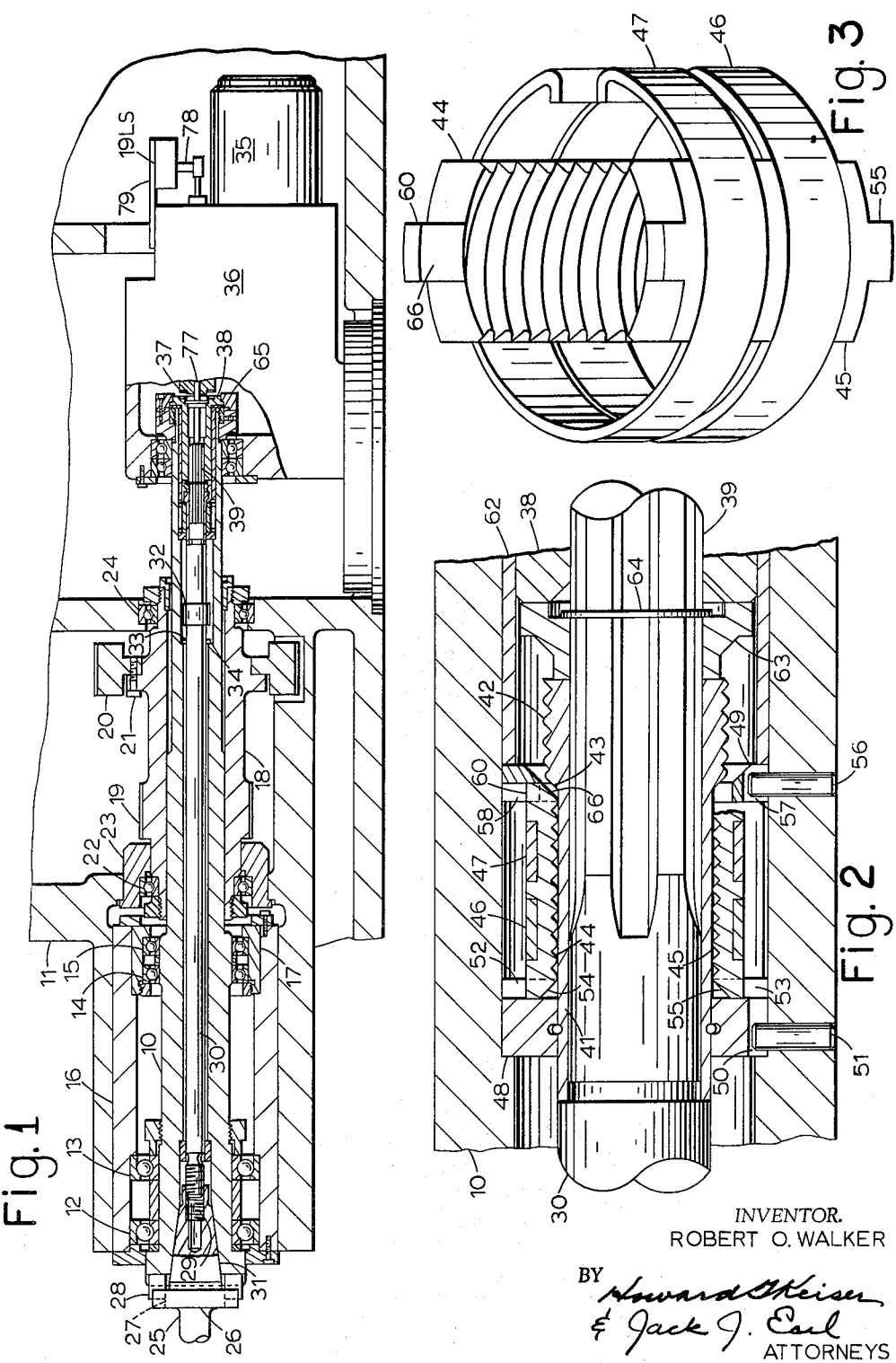
INVENTOR.
ROBERT O. WALKER
BY Howard C. Keiser
& Jack J. Earl
ATTORNEYS 3,205,779
DRAWBOLT FOR MACHINE TOOL SPINDLES
Robert O. Walker, Cincinnati, Ohio, assignor to The Cincinnati Milling Machine Co., Cincinnati, Ohio, a corporation of Ohio
Filed Dec. 23, 1963, Ser. No. 332,652
10 Claims. (Cl. 90—11)

The present invention relates to machine tool spindles and more particularly to a drawbolt mechanism especially suited for power operation in a milling machine spindle to secure and release cutters.

Milling cutters are usually held in a standard spindle adapter which is comprised of a tapered locating surface, a threaded socket into which a drawbolt is turned to pull the tapered surface securely against a mating spindle surface, and a collar having diametrically opposed notches therein into which drive keys on the spindle nose fit to transmit spindle rotation to the cutter. Due to the forces present in milling operations, the cutter is best held as close to the mass of the spindle as possible with a minimum of overhang or extension outward therefrom. Consequently the drive keys are rather short and do not extend a distance equal to the depth into which the drawbolt is normally inserted into the cutter adapter. Since cutters are usually held by the operator during insertion and release in the spindle, it is an important feature that the cutter adapter be engaged on the drive keys when the drawbolt is turned by power to prevent the cutter from turning in the operator's hands and thereby inflicting injury to him. The drawbolt therefore must be held in the spindle in such a position that it does not extend outward far enough prior to power insertion into an adapter to be contacted by the adapter prior to the adapter's engagement with the drive keys. Similarly, when the cutter is to be released, it is important that the drawbolt be retracted from the adapter so as to maintain the adapter in engagement on the drive keys until the drawbolt is completely free of the adapter threads.

It is therefore an object of this invention to provide a mechanism to prevent the extension of a drawbolt from the spindle beyond a predetermined amount except when the adapter is firmly seated in the spindle whereby the cutter adapter is always engaged on the drive keys when the drawbolt is turned into or out of engagement with the adapter threads.

Another object of this invention is to provide a power drawbolt mechanism which warns an operator at the point of incipient final release of the cutter from the spindle of a machine as the drawbolt is withdrawn.

Other objects and advantages of the present invention should be readily apparent by reference to the following specification, considered in conjunction with the accompanying drawings forming a part thereof, and it is to be understood that any modifications may be made in the exact structural details there shown and described, within the scope of the appended claims, without departing from or exceeding the spirit of the invention.

In its preferred form, the drawbolt mechanism of this invention includes a threaded area along its length adapted to engage in the thread of half-nuts only when the drawbolt has pulled the adapter firmly and fully into the spindle nose. The thread of this area is of the same lead and hand as the drawbolt thread by which the adapter is engaged. Therefore the drawbolt follows into the adapter until a stop is reached by the drawbolt to provide the clamping force required to hold the adapter firmly in the spindle. Upon release rotation of the drawbolt, the threaded area turns completely out of the half-nuts and therefore holds the adapter on the drive keys during release. The drawbolt is freely rotatable in the spindle one way and the other and is movable through only a small axial range when the drawbolt is not engaged with an adapter. When the drawbolt is engaged with an adapter but the adapter is not pulled inward to a firm seating in the spindle nose, the drawbolt rotates but does not move from this limited axial range until the adapter has been pulled inward to a firm seating in the spindle nose. During release of an adapter from the spindle, signal means respond when the drawbolt has been turned partly out of the adapter but while a predetermined portion is still in engagement to stop the power drawbolt operation to warn the machine operator that the adapter is nearly free. The mechanism includes a final release switch which the operator then actuates so that the final release is completed at a time when the operator expects it and can be prepared for it.

A clear understanding of the present invention can be obtained from the following detailed description in which reference is made to the attached drawings wherein:

FIG. 1 is a section view of a milling machine spindle.

FIG. 2 is an enlarged view of a portion of the section shown in FIG. 1.

FIG. 3 is a perspective view of part of the mechanism shown in section in FIG. 2.

Figure 4:
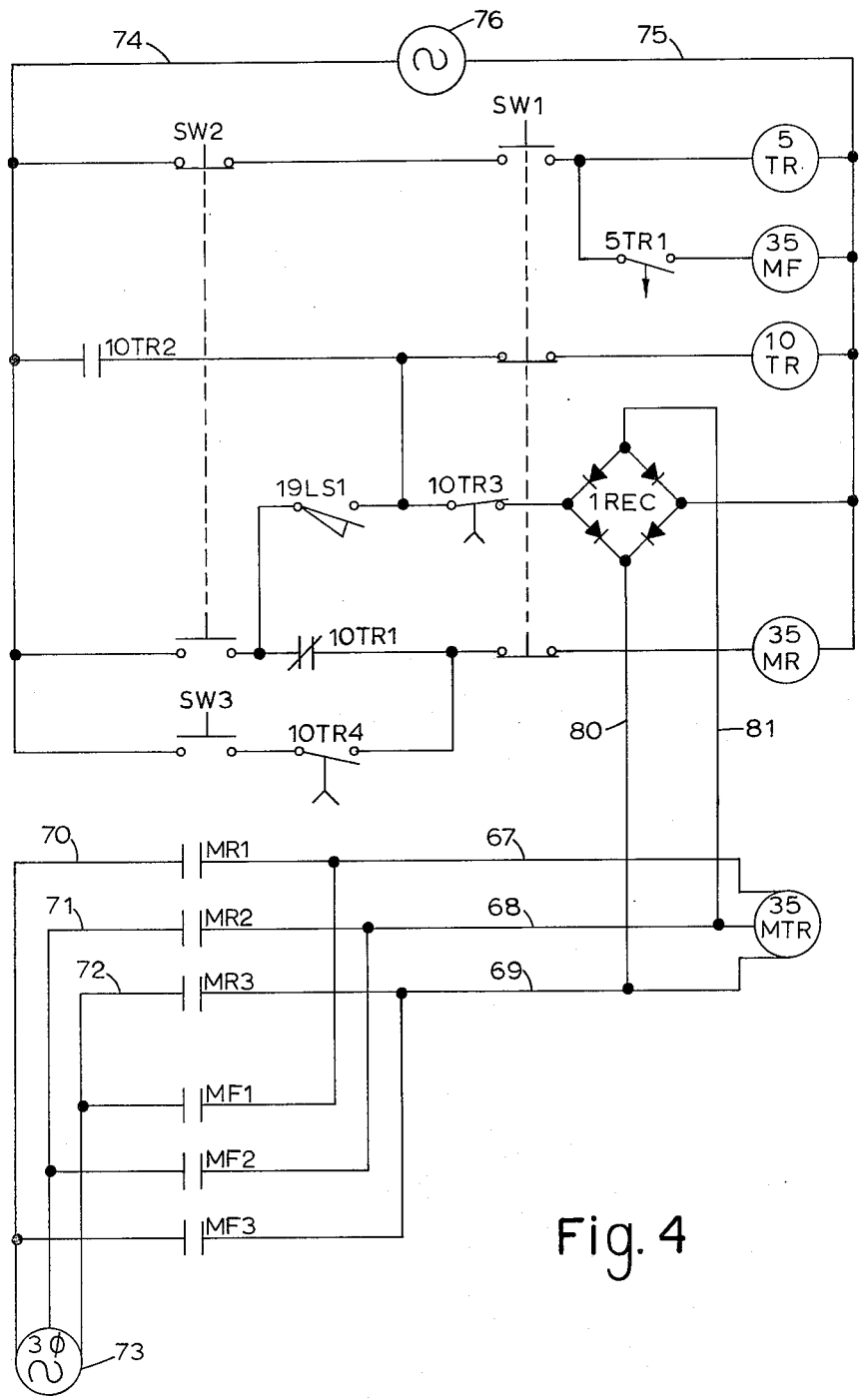
FIG. 4 is a schematic electrical control diagram for operation of the mechanism shown in FIGS. 1–3.

The spindle 10 shown in FIG. 1 is received in a spindle carrier 11 for rotation therein. The forward portion of the spindle 10 is received in antifriction bearings 12–15 which rigidly hold the spindle 10 on a fixed axis in the carrier 11 but which permit free rotation thereof. The forward bearings 12, 13 are received directly between the spindle 10 and a sleeve 16 that is fixed in the carrier 11. The bearings 14, 15 are received between the spindle 10 and a bushing 17 secured firmly in the sleeve 16. A sleeve 18 is fixed on the rear portion of the spindle 10 and has a high speed range drive gear 19 integral therewith and a slow speed range drive gear 20 attached thereto by screws 21. The gears 19, 20 provide the means by which rotational drive is connected to the spindle 10. The drive sleeve 18 is rotatably received at one end in bearings 22 held in a bushing 23 that is fixed in the carrier 11 and at the other end in bearings 24 received directly between the sleeve 18 and the carrier 11.

The nose of the spindle 10 is adapted to receive a standard cutter adapter 25 which has a collar 26 with notches 27 therein that fit over drive keys 28 that are fixed on the nose of a spindle 10. The adapter 25 has a threaded socket 29 into which a drawbolt 30 is turned to pull the adapter 25 into firm contact at mating tapered surfaces 31 between the cutter adapter 25 and the spindle 10. The drawbolt 30 has a collar portion 32 that is pulled into firm contact with a thrust washer 33 received at a shoulder 34 in the spindle 10 to produce the clamping force required to firmly hold the adapter 25 in the spindle 10. The drawbolt 30 is power rotated through the operation of a motor 35 housed in the carrier 11 at the rear of the spindle 10. The motor operates through a mechanism 36 like that shown in U.S. Patent 2,667,819 which was granted to Charles B. De Vlieg on February 2, 1954. The details of this mechanism 36 are not shown or described in detail herein since the specific drive forms no part of the present invention. Any of the various drawbolt drive devices known in the art which furnish a reversible rotary impact drive will work as the drive means in combination with the present invention. The motor 35 operates to rotate a clutch drive member 37 as in the cited patent that is insertable into a drive bushing 38 which is in axial sliding engagement over the splined portion 39 of the drawbolt 30. The rotary drive to drawbolt 30 is transmitted through this splined portion 39.

The mechanism shown in FIG. 2 is that by which the drawbolt 30 is maintained in the spindle 10 such that at all times when the threaded socket 29 is engaged by the drawbolt 30, the keys 28 are inserted at least partly into the notches 27. The drawbolt 30 has a sleeve 41 rigidly attached thereto by assembling together when the sleeve 41 is heated and the drawbolt 30 is cooled and then equalizing their temperatures. The sleeve 41 is hardened and has a section of 90 degree vee-threads 42 thereon of the same lead as the thread in the adapter socket 29. The crest of the thread 42 in the sleeve 41 is rounded to avoid any sharp edges at the threads. An inclined camming surface 43 in the form of a chamfered end extends around the sleeve 41 to join the threaded section with the rest of the sleeve 41. A pair of half-nuts 44, 45 having the same thread as the section 43 with rounded thread crests are engaged over the sleeve 41 and held thereagainst by a pair of C-shaped springs 46, 47, shown also in FIG. 3. The half-nuts are movable away from the sleeve 41 against the force of the springs 46, 47 which tends to return them to the position shown. The half-nuts 44, 45 are not rotatable however. At each end of the nuts is a retainer member 48, 49 and these are maintained at a fixed position in the spindle 10. The retainer member 48 has a notch 50 therein (shown 90 degrees out of position) into which a pin 51 extends to prevent relative rotation between the spindle 10 and the retainer member 48. There is also a pair of transverse grooves or notches 52, 53 on the end face of the member 48 adjacent the half-nuts 44, 45. Each of these half-nuts 44, 45 has a tongue 54, 55 which extends into one of the notches 52, 53, respectively. The retainer member 49 is also held from rotating by a pin 56 (also shown 90 degrees out of position) which extends into a notch 57 in that retainer member. Similarly, the member 49 has a pair of transverse notches 58 into which a tongue 60 on the other end of each of the half-nuts extends. The notches 52, 53, 58 prevent the half-nuts 44, 45 from rotating but allow for their movement toward and away from the sleeve 41. The retainers 48, 49 and half-nuts 44, 45 are held together in the spindle 10 by a bushing 62 which is fixed inside the spindle 10 and bears against one side of the retainer member 49. A stop ring 63 is held on the drawbolt 30 at one end of the sleeve 41 by a snap ring 64. The stop ring 63 is adapted to engage the inner end of the drive bushing 38 which is axially fixed in the spindle by a ring 65 (FIG. 1) although it is rotatable. The drive bushing 38 acts to stop axial movement of the drawbolt rearwardly in the spindle 10 when the stop ring engages the bushing 38 as shown. While axial movement of the drawbolt 30 in the forward direction is ultimately stopped by the collar 32 and thrust washer 33, free axial movement of the drawbolt 30 occurs only in accordance with the amount of clearance between the cam surface 43 and a pair of mating camming surfaces 66 of complementary slope. Thus the drawbolt is held rearward within the confines of the clearances described until a substantial pull is exerted on the drawbolt 30 as when it is rotated and in threaded engagement with an adapter 25 that is firmly in contact at the surfaces 31. The half-nuts 44, 45 will then be cammed outward by the interaction of the chamfered surfaces 43 and 66 to allow the threaded section 42 to advance into the half-nuts 44, 45. Therefore the drawbolt 30 moves forward only when the adapter 25 is firmly seated at the surfaces 31 and continues to move forward until the adapter is securely locked in the spindle 10.

In release of the cutter adapter 25 from the spindle, the drawbolt is reversely rotated and it moves rearward through the half-nuts 44, 45 and out of the threaded socket 29 until the stop ring 63 engages the drive bushing 38 at which time it stops and the adapter 25 is then pushed outward from the spindle 10 through the action of the threaded socket 29 and the threaded end of the drawbolt 30. If the adapter 25 should stick in the spindle at the surfaces 31, the engagement of the stop ring 63 and drive bushing 38 acts to forcibly break the surfaces loose.

The range of positions in which the drawbolt 30 is normally freely axially movable, between the surfaces 66 and the lower end of the drive bushing 38, is such that the drawbolt 30 is held rearward in a manner requiring that the adapter 25 be inserted onto the keys 28 at the notches 27 before the thread of the socket 29 can be engaged by the forward end of the drawbolt 30. Therefore the machine operators hands are safe since no rotation of the adapter can occur by operation of the powered drawbolt 30. Similarly, the drawbolt 30 is retracted rearwardly into the spindle by a sufficient amount upon release rotation of the drawbolt to prevent the adapter 25 from falling off of the keys 28 until the drawbolt 30 is removed completely from the socket 29.

A control circuit for the operation of the described mechanism is shown in FIG. 4. The windings of the motor 35, FIG. 1, are represented by the circle identified as 35MTR. The motor 35 is an alternating current, three phase motor having power lines 67–69 connected to two sets of relay contacts MF1–MF3 and MR1–MR3 which are operated to produce forward and reverse energization, respectively, of the motor 35 to advance and retract the drawbolt 30. The sides of the contacts MF1–MF3 and MR1–MR3 opposite the motor windings 35MTR are connected to the three phase power supply lines 70–72 that extend from a three phase source 73. It can be seen that the supply lines 70–72 are connected in a reversed order to the motor lines 67–69 by the contacts MF1–MF3 when closed relative to the order of connection by the contacts MR1–MR3 when they are closed and it is in this manner that the motor is energized for operation in one and the other directions.

The contacts MF1–MF3 are operated by a relay coil 35MF which is energized to close those contacts when a circuit is completed across a pair of power lines 74, 75 and through the coil 35MF. The lines 74, 75 are supplied single phase power from a source 76. A push button switch SW1 is included in the circuit and when it is pushed and held closed, the circuit is completed to but not through the relay coil 35MF but a circuit is complete through the coil of a timing relay 5TR. The contacts 5TR1 close without delay upon the energization of the timer coil 5TR and then the relay coil 35MF is energized and the contacts MF1–MF3 are closed to operate the motor 35 such that it rotates the drawbolt to advance it into the socket 29 of an adapter 25. The switch SW1 is released when the machine operator determines that the adapter is firmly seated on the tapered surfaces 31. The relay coil 35TR and the timer coil 5TR are deenergized and the contact 5TR1 immediately opens. The contact 5TR1 will not however reclose until a preset timed period after opening and thus prevents an immediate restart of the motor 35. This tends to prevent an operator's using the motor to tighten the drawbolt too much and tends to prevent breaking of the drawbar by imposing a period in which the opertaor has time to examine the looseness of the adapter 25 in the spindle 10.

The adapter 25 is released from the spindle by reverse operation of the motor 35 and this is accomplished by reversing the connections to the windings 35MTR as described by closing the contacts MR1–MR3 which are operated by a relay coil 35MR. This coil 35MR is initially energized by pushing in and holding a switch SW2 which completes a circuit through the normally closed timer contacts 10TR1 and the coil 35MR. The motor 35 begins to run and the drawbolt 30 is turned out of the socket 29 and rearward through the half-nuts 44, 45. A rod 77 is slidably received through the unit 36 and is biased by a spring (not shown) axially toward the drawbolt 30 which it engages at the center of its rear end. The rod 77 extends out from the unit 36 where it engages an operating lever 78 of a limit switch 19LS that is attached by a bracket 79 to the unit 36. The rod is of such a length and the lever 78 is adjusted so that the switch is operated to close a contact 19LS1 at a time when the drawbolt 30 is turned nearly out of the socket 29 but while sufficient threads are still engaged to prevent the adapter 25 from falling from the spindle 10. This occurs when the drawbolt 30 has moved rearwardly to a position in which the stop collar 63 has moved to a position proximate to the bushing 38 which forms the rearward stop. The closing of the contacts 19LS1 simultaneously energizes a timer coil 10TR and applies power to a bridge rectifier 1REC. The contacts 10TR1 open to deenergize the relay coil 35MR and to open the contacts MR1–MR3 and the contacts 10TR2. The rectifier 1REC supplies direct current power through lines 80, 81 to one of the windings 35MTR to brake the motor 35 very quickly. After a brief interval of time sufficient to stop the motor 35, the contacts 10TR3 are opened by the timer 10TR and the contacts 10TR4 are closed at the same time. The contacts 10TR1 remain open and the contacts 10TR2 remain closed. The operator can now release the cutter adapter 25 from the spindle by depressing a second release switch SW3 which causes the coil 35MR to be energized through the contact 10TR4. The motor 35 is energized and the final few turns of thread of the drawbolt are removed from the socket 29. It can be seen from this that the machine operator is warned that the adapter 25 is nearly free by the stopping of the motor 35. This enables him to make ready for the adapter's release. The switch SW3 can be placed conveniently on the spindle carrier 11 in a position where the operator can depress it with a forearm or elbow when both hands are on the adapter 25 to hold it. Since the operator can grasp the cutter with both hands, cutter damage and breakage as well as damage to machine tables and work fixtures resulting from dropped cutters can be prevented.

While the invention has been described in connection with one form or embodiment thereof, it is to be understood that the present disclosure is illustrative rather than restrictive and that changes and modifications may be resorted to without departing from the spirit of the invention or the scope of the claims which follow.

What is claimed is:

1. In a machine tool spindle suited to receive a cutting tool adapter and having a rotatable and axially movable drawbolt therein to threadedly engage and secure the tool adapter in the spindle and reversibly operable means to rotate the drawbolt to secure and release the tool adapter, the combination comprising:
    (a) a rear stop in the spindle adapted to limit rearward movement of the drawbolt to an extreme retracted position,
    (b) a forward stop in the spindle adapted to limit forward movement of the drawbolt to an extreme advanced position,
    (c) restraining means for limiting movement of the drawbolt forward from the extreme retracted position to an intermediate position between the extreme advanced and retracted positions, and
    (d) means for releasing said restraining means to allow forward movement of the drawbolt to the extreme advanced position when a predetermined forward axial force is exerted on the drawbolt.

2. In a machine tool spindle suited to receive a cutting tool adapter and having a rotatable and axially movable drawbolt therein to threadedly engage and secure the tool adapter in the spindle and reversibly operable means to rotate the drawbolt to secure and release the tool adapter, the combination comprising:
    (a) a rear stop in the spindle adapted to limit rearward movement of the drawbolt to an extreme retracted position,
    (b) a forward stop in the spindle adapted to limit forward movement of the drawbolt to an extreme advanced position,
    (c) restraining means retained in the spindle for limiting movement of the drawbolt forward from the extreme retracted position to an intermediate position between the extreme advanced and retracted positions,
    (d) an operating member on the drawbolt operable to release said restraining means when a predetermined forward axial force is exerted on the drawbolt to allow forward movement of the drawbolt beyond said intermediate position, and
    (e) means cooperating between said restraining means and operating member for directing the drawbolt axially when the drawbolt is advanced beyond said intermediate position and rotated.

3. In a machine tool spindle suited to receive a cutting tool adapter and having a rotatable and axially movable drawbolt therein to threadedly engage and secure the tool adapter in the spindle and reversibly operable power means to rotate the drawbolt to secure and release the tool adapter, the combination comprising:
    (a) a rear stop in the spindle adapted to limit rearward movement of the drawbolt to an extreme retracted position,
    (b) a forward stop in the spindle adapted to the limit forward movement of the drawbolt to an extreme advanced position,
    (c) a pair of threaded half-nuts received in the spindle for limited movement transverse to the drawbolt,
    (d) an enlarged diameter section on the drawbolt having threads thereon of the same lead and hand as said half-nuts, said enlarged diameter portion located rearwardly from said half-nuts when the drawbolt is in said extreme retracted position,
    (e) means for yieldably holding said half-nuts against the drawbolt, said half-nuts adapted when held against the drawbolt to stop forward movement of said drawbolt in an intermediate position between the extreme retracted and advanced positions, and
    (f) a cam surface on the forward end of said enlarged diameter portion adapted to engage said half-nuts and to shift them away from the drawbolt when a predetermined axial force acts on the drawbolt in the forward direction, said half-nuts and enlarged diameter portion threadedly mating and directing the drawbolt axially through the said half-nuts when said the drawbolt is rotated by the power means and said half-nuts are shifted away from the drawbolt.

4. In a machine tool spindle suited to receive a cutting tool adapter and having a rotatable and axially movable drawbolt therein to threadedly engage and secure the tool adapter in the spindle and means to rotate the drawbolt to secure and release the tool adapter, the combination comprising:
    (a) a rear stop in the spindle adapted to limit rearward movement of the drawbolt to an extreme retracted position,
    (b) a forward stop in the spindle adapted to limit forward movement of the drawbolt to an extreme advanced position,
    (c) a pair of threaded half-nuts received in the spindle and over the drawbolt for limited movement toward and away therefrom, each having an internal chamfered surface on the rearward end thereof,
    (d) an enlarged diameter section on the drawbolt having threads thereon of the same lead and hand as said half-nuts and a chamfered surface on the forward end thereof complimentary to said chamfered surfaces of said half-nuts, said enlarged diameter section located rearwardly from said half-nuts when the drawbolt is in said extreme retracted position, and
    (e) means for yieldably holding said half-nuts against the drawbolt, said chamfered surfaces engaging to stop forward movement of the drawbolt in a predetermined position rearward from said extreme advanced position and said chamfered surface of the enlarged diameter section adapted to force said half-nuts away from the drawbolt when a predetermined axial force acts on the drawbolt in the forward direction to permit engagement of said half-nut and enlarged diameter threads and axial movement of the drawbar forward from said predetermined position.

5. In a machine tool spindle, a mechanism comprising:
 (a) a drawbolt rotatable in the spindle and axially movable therein over a limited range,
 (b) an enlarged diameter portion on said drawbolt having a chamfered forward surface therearound,
 (c) a set of stop members received in the spindle for movement transverse to said drawbolt and located forward of said enlarged diameter portion when the drawbolt is in its rearmost position, and
 (d) means for yieldably urging said stop members toward said drawbolt for engagement by said enlarged diameter portion when the drawbolt is urged forward from its rearmost position, said stop members and said means operating to prevent movement of said drawbolt forward until a force of a predetermined magnitude acts on said drawbolt whereupon said chamfered surface operates to force said stop members away from said drawbolt.

6. In a machine tool spindle, a mechanism comprising:
 (a) a drawbolt rotatable in the spindle and axially movable therein over a limited range,
 (b) an enlarged diameter portion on said drawbolt having a chamfered forward surface therearound and a threaded surface therealong,
 (c) a pair of half-nuts received in the spindle for movement transverse to said drawbolt and located forward of said enlarged diameter portion when the drawbolt is in its rearmost position, and
 (d) a set of springs in the spindle and engaged with said half-nuts for urging thereof toward said drawbolt, said half-nuts and springs operating to prevent movement of said drawbolt forward until a force of a predetermined magnitude acts on said drawbolt whereupon said half-nuts are shifted away from the drawbolt by said chamfered surface to permit engagement of said half-nuts with said threaded surface.

7. In a machine tool spindle a mechanism comprising:
 (a) a drawbolt rotatable in the spindle and axially movable therein over a limited range,
 (b) operating means to rotate said drawbolt,
 (c) stop means adapted for releasably engaging said drawbolt to hold said drawbolt in a predetermined rearward position and prevent movement thereof forward from said predetermined rearward position,
 (d) release means on said drawbolt adapted for engaging said stop means and operable to release said stop means when said drawbolt is urged forward from said predetermined rearward position by an axial force of predetermined magnitude, and
 (e) means for producing axial movement of said drawbolt when said drawbolt is forward of said predetermined rearward position and rotated.

8. In a machine tool spindle a mechanism comprising:
 (a) a drawbolt rotatable in the spindle and axially movable therein over a limited range,
 (b) an enlarged diameter portion on said drawbolt having a chamfered forward surface therearound and a threaded surface therealong,
 (c) a pair of half-nuts received in the spindle for movement transverse to said drawbolt and located forward of said enlarged diameter portion when the drawbolt is in its rearmost position,
 (d) a set of springs in the spindle and engaged with said half-nuts for urging thereof toward said drawbolt for engagement by said chamfered surface to stop movement of said drawbolt forward, said chamfered surface transmitting a force to said half-nuts in opposition to said springs when the drawbolt is urged forward, said springs yieldable to a predetermined force from said chamfered surface to permit engagement of the half-nuts with said threaded surface, and
 (e) means for rotating said drawbolt selectively in one direction and the other, said half-nuts and threaded surface directing axial movement of said drawbolt when engaged and upon rotation of the drawbolt.

9. In a machine tool spindle suited to receive a cutting tool adapter and having a rotatable and axially movable drawbolt therein to threadedly engage and secure the tool adapter in the spindle, the combination comprising:
 (a) a rear stop in the spindle adapted to engage and stop rearward movement of the drawbolt,
 (b) a forward stop in the spindle adapted to engage and stop forward movement of the drawbolt,
 (c) a reversibly operable motor,
 (d) means for connecting said drawbolt to said motor for rotation thereby,
 (e) control means for energizing said motor selectively to rotate the drawbolt in one and the other directions to secure and release, respectively, the tool adapter,
 (f) means for directing the drawbolt rearwardly toward said rear stop from said forward stop when the drawbolt is rotated in said other direction,
 (g) safety means for deenergizing said motor when said drawbolt is moved from said forward stop to a position proximate to said rear stop, and
 (h) restart means for energizing said motor to rotate the drawbolt in said other direction after deenergization by said safety means.

10. In a machine tool spindle suited to receive a cutting tool adapter and having a rotatable and axially movable drawbolt therein to threadedly engage and secure the tool adapter in the spindle, the combination comprising:
 (a) a rear stop in the spindle adapted to engage and stop rearward movement of the drawbolt,
 (b) a forward stop in the spindle adapted to engage and stop forward movement of the drawbolt,
 (c) a reversibly operable motor,
 (d) a clutch operable to connect said drawbolt to said motor for rotation thereby,
 (e) control means for energizing said motor selectively to rotate the drawbolt in one and the other directions to secure and release, respectively, the tool adapter,
 (f) means for directing the drawbolt rearwardly toward said rear stop when the drawbolt is rotated in said other direction,
 (g) a limit switch having contacts connected in circuit with said control means and operable to deenergize said motor when said limit switch is operated while said motor is rotating said drawbolt in said other direction,
 (h) means for operating said limit switch when said drawbolt is moved rearwardly to a position proximate to said rear stop, and
 (i) an override switch connected in circuit with said control means and rendered effective by operation of said limit switch and operable when closed and rendered effective to energize said motor for rotation of said drawbolt in said other direction.

References Cited by the Examiner

UNITED STATES PATENTS

| | | | |
|---|---|---|---|
| 2,924,152 | 2/60 | Zettler | 90—11 |
| 2,994,250 | 8/61 | Walter et al. | 90—11 |

WILLIAM W. DYER, Jr., *Primary Examiner.*